United States Patent
Yamaguchi

[11] Patent Number: 6,029,560
[45] Date of Patent: Feb. 29, 2000

[54] FLUID PRESSURE OPERATED TORQUE AMPLIFIER AND A VEHICULAR POWER STEERING SYSTEM INCORPORATING SAME

[75] Inventor: Masayoshi Yamaguchi, Kyoto, Japan

[73] Assignee: Eaton Corporation, Cleveland, Ohio

[21] Appl. No.: 09/045,782

[22] Filed: Mar. 20, 1998

[30] Foreign Application Priority Data

Mar. 25, 1997 [JP] Japan .................................. 9-091457

[51] Int. Cl.⁷ .................................................. F15B 9/10
[52] U.S. Cl. ...................................................... 91/375 R
[58] Field of Search ........................... 60/384, 385, 387; 91/375 R; 180/403, 429, 431

[56] References Cited

U.S. PATENT DOCUMENTS

| | | | |
|---|---|---|---|
| 2,138,050 | 11/1938 | Vickers | 91/375 R |
| 2,821,171 | 1/1958 | Charlson | 91/375 R |
| 2,899,937 | 8/1959 | Nuebling | 91/375 R |
| 3,452,543 | 7/1969 | Goff et al. | 60/384 |
| 3,481,147 | 12/1969 | Goff | 60/384 |
| 4,381,905 | 5/1983 | Peterson | 91/375 R |
| 4,503,753 | 3/1985 | Bacardit | 91/375 R |
| 4,771,809 | 9/1988 | Anguera | 91/375 R |
| 4,936,094 | 6/1990 | Novacek | 60/384 |
| 5,042,250 | 8/1991 | Carlson et al. | 60/385 |

*Primary Examiner*—F. Daniel Lopez
*Attorney, Agent, or Firm*—L. J. Kasper

[57] ABSTRACT

A compact and inexpensive fluid pressure operated torque amplifier and a power steering system incorporating such torque amplifier to eliminate the need for a separate return fluid conduit. The power steering system (10) includes a fluid pressure operated torque amplifier (12), a reduction gear unit (16) disposed within a cavity (53) of a transmission casing (14), and a steering linkage (20) for wheels. The torque amplifier includes a control valve assembly (24) disposed in a housing (22), a torque amplifier unit (32), a high torque drive shaft (58) and an output shaft (54). The output shaft of the torque amplifier serves as an input member of the reduction gear unit. The torque amplifier also includes a pressurized fluid inlet (78) provided in the housing and a return fluid outlet (61) provided in the output shaft (54), both the inlet and outlet being in communication with the cavity of the transmission casing.

6 Claims, 2 Drawing Sheets

6,029,560

FLUID PRESSURE OPERATED TORQUE AMPLIFIER AND A VEHICULAR POWER STEERING SYSTEM INCORPORATING SAME

CLAIM FOR FOREIGN PRIORITY

This application claims priority, under 35 U.S.C. 119, of earlier-filed Japanese Application HEI 9-91457, filed Mar. 25, 1997.

BACKGROUND OF THE INVENTION

1. Field of the Invention

The present invention relates to a fluid pressure operated torque amplifier (sometimes called "torque generator") and a vehicular power steering system incorporating such torque amplifier.

2. Description of the Prior Art

Generally, a fluid pressure operated torque amplifier has been used in a power steering system for a construction vehicle, an agricultural machine such as a rice transplanter, or a ship, and also in a gate or valve opening or closing device which needs large torque to operate it. Such a torque amplifier typically comprises a housing having a pressurized fluid inlet in communication with a source of pressurized fluid and a return fluid outlet in communication with a reservoir, a torque amplifier unit having an internally toothed member and an externally toothed member disposed within the internally toothed member for orbital motion therewith, the teeth of the internally and externally toothed members intermeshing to form a plurality of expanding and contracting volume chambers, a control valve assembly for controlling the fluid flow between the pressurized fluid inlet and the return fluid outlet, an input member operatively associated with the control valve assembly, and an output member for transmitting the power generated by the torque amplifier unit.

In the vehicular power steering system, such a fluid pressure operated torque amplifier is used as a steering actuator for wheels and their associated steering linkage. Disposed between the torque amplifier unit and the steering linkage, in a power transmitting relationship, is a reduction gear unit comprising typically an input gear and an output gear in meshing engagement therewith, which gear unit is positioned within a cavity in a transmission casing serving as a fluid reservoir. The input gear of the reduction gear unit has an input shaft extending upwardly through the transmission casing for coupling to the downwardly extending output shaft of the torque generator. The pressurized fluid inlet and the return fluid outlet of the torque amplifier are in communication with the cavity in the transmission casing by way of a pressurized fluid line connected to a pump and a separate return fluid line, respectively, so that when the control valve assembly is operated from a neutral position to a steering operating position, the pressurized fluid coming from the pump through the pressurized fluid line flows through the inlet port, the control valve assembly, the torque amplifier unit, the outlet port and the return line to the reservoir. Disposed between the pressurized fluid line and the return fluid line is a relief valve which acts to relieve the pressure depending upon steering conditions, for example, when the wheels become stuck on an obstacle.

PROBLEMS TO BE SOLVED BY THE INVENTION

In this type of conventional vehicular power steering system, an operational problem (called "steering stick or lock") sometimes arises wherein a radial load developed especially at the output shaft of the torque amplifier tends to prevent smooth steering by an operator. In order to ensure a proper steering operation, it is necessary to provide a bearing for supporting coupling means between the output shaft of the torque amplifier and the input shaft of the reduction gear unit so as to support the radial load exerted to the output shaft of the torque amplifier. This will require more parts and a complicated structure, resulting in an increased cost. For use in a vehicle including a power steering system incorporating a torque amplifier, such as a rice transplanter, it is desirable to provide a less costly system arrangement.

Attempts have been made in the prior art to dispense with the bearing by providing sufficient play in the coupling portion to thereby reduce costs. However, this tends to create the operational problem of steering stick or lock. Furthermore, in this particular field of art, it is an important design consideration to reduce the number of parts in the fluid pressure operated torque amplifier per se, in order to provide an inexpensive, compact and reliable torque amplifier.

SUMMARY OF THE INVENTION

It is, therefore, an object of the present invention to solve the above-stated prior art problems and to provide an inexpensive and compact fluid pressure operated torque amplifier.

It is another object of the present invention to provide an inexpensive and reliable vehicular power steering system incorporating such a fluid pressure operated torque amplifier.

According to the present invention, there is provided an improved fluid pressure operated torque amplifier comprising: a housing having a pressurized fluid inlet leading from a source of pressurized fluid; a torque amplifier unit including a first stationary internally toothed member and a second externally toothed member disposed within the first internally toothed member for orbital motion therein, the teeth of the first internally toothed member and the second externally toothed member intermeshing to form a plurality of expanding and contracting volume chambers for hydraulically generating a motive power; a control valve assembly disposed within the housing adjacent to the torque amplifier unit and adapted to be operated between a neutral position in which a first fluid flow path is established to bypass the volume chambers and a left and a right steering position in which corresponding flow paths are established to supply the pressurized fluid to the volume chambers, the control valve assembly comprising a first rotatable member having an input member extending outwardly from the housing, and a second rotatable follower member telescopingly disposed relative to the first rotatable member, a rotation of the first rotatable member through rotation of the input member causing the first rotatable member and the second rotatable follower member to rotate relative to each other to move the control valve assembly from the neutral position to the left or right position; a first drive shaft disposed within the first rotatable member and having one end drivably connected to the second rotatable follower member and the other end drivingly connected to the second externally toothed member of the torque amplifier unit; a second drive shaft having one end drivably connected to the second externally toothed member of the torque amplifier unit and the other end drivingly connected to an output shaft.

The improved torque amplifier is characterized in that the output shaft has a return fluid outlet leading to a reservoir;

the first and second drive shafts have passages formed therein and that when the control valve assembly is in the left or right position, the fluid exiting the volume chambers of the torque amplifier unit flows through the control valve assembly, the passages of the first and second drive shafts and the return fluid outlet of the output shaft into the reservoir.

According to the present invention, there is also provided a power steering system for use in a vehicle, comprising: a control valve assembly disposed within a housing and including a steering torque input means adapted to be operated between a neutral position and a left and a right steering position; a fluid pressure operated torque amplifier including a torque amplifier unit adapted to generate an amplified torque in dependence upon the position of the steering torque input means and a drive shaft for transmitting the amplified torque generated by the torque amplifier unit to an output means; a reduction gear unit disposed within a cavity in a transmission casing and having an input member drivably connected to the output means of the torque amplifier unit and an output member drivingly connected to a steering linkage for the vehicle.

The improved power steering system is characterized in that the torque amplifier is mounted on the transmission casing, the output means of the torque amplifier extends into the cavity of the transmission casing to serve as the input member of the reduction gear unit; the housing has a pressurized fluid inlet leading from a reservoir through a pump; the output means of the torque amplifier has an outlet for the return fluid leading to the reservoir through which the return fluid flows from the torque amplifier into the reservoir. In a preferred embodiment of the invention, a major portion of the length of the second drive shaft is accommodated within the bore of the output shaft. One end of the second drive shaft is drivably connected to the second toothed member, and the other end of the second drive shaft is connected drivingly to the splined bore of the output shaft.

DETAILED DESCRIPTION OF THE PREFERRED EMBODIMENT

Figure 1:
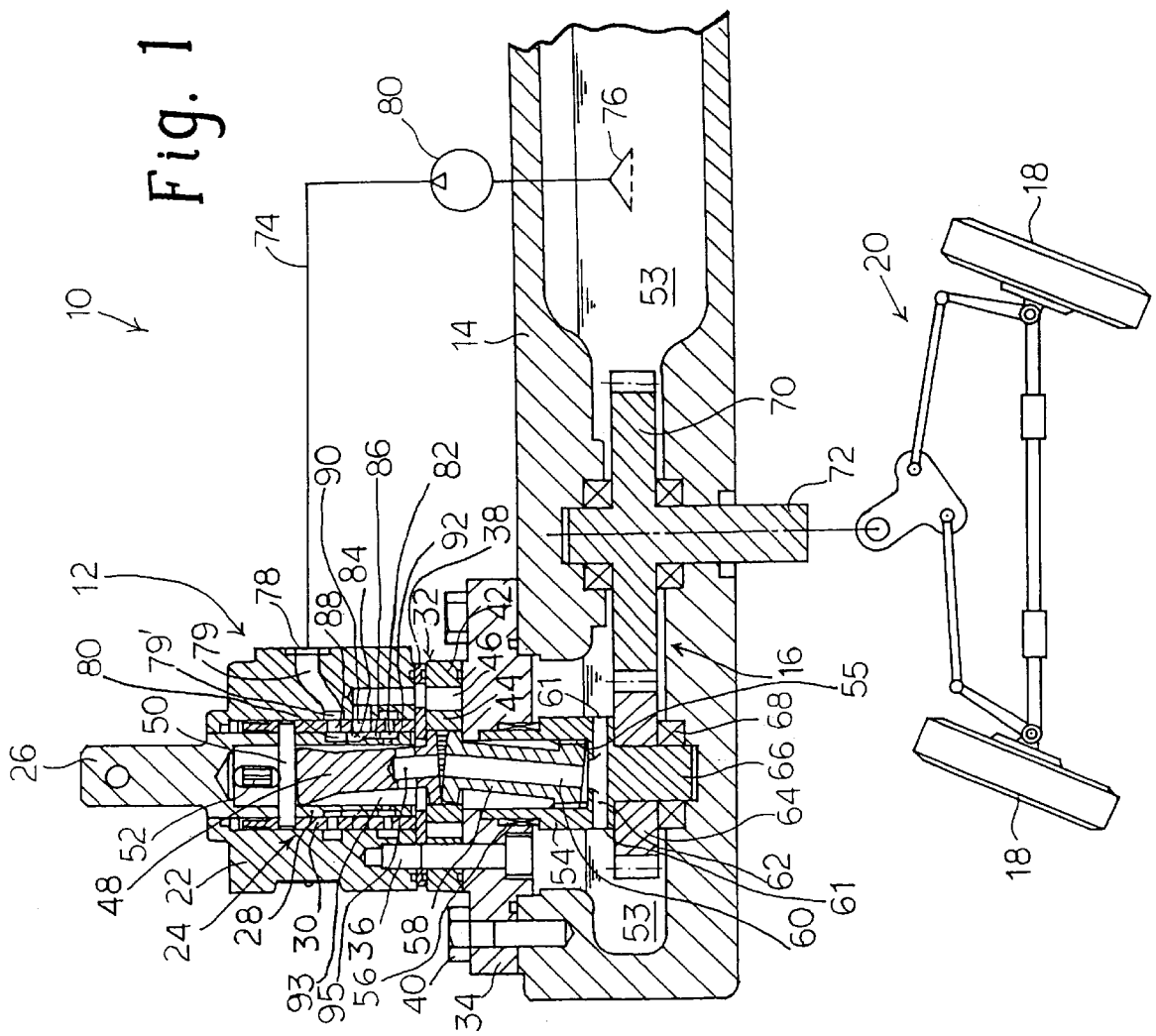
FIG. 1 is a schematic representation of the overall structure of the vehicular power steering system incorporating a torque amplifier embodying the present invention.

Referring to the drawings and particularly to FIG. 1, there is shown a power steering system 10 which is adapted for use in a rice transplanter, for example, and which incorporates a fluid pressure operated torque amplifier or generator according to the present invention. As shown, the power steering system 10 comprises, as major components thereof, a torque amplifier 12, a reduction gear unit 16 disposed in a transmission casing 14, and a steering linkage 20 associated with a pair of wheels 18, these components being in a serial power or mechanical motive force transmitting relationship.

The fluid pressure operated torque amplifier 12 includes a housing 22 in which a control valve or change-over valve assembly 24 is disposed generally centrally thereof The control valve assembly 24 includes a hollow, cylindrical and rotatable spool member 28 having a top end 26 serving as an input member for coupling to a steering wheel (not shown), and a hollow, cylindrical and rotatable sleeve follower member 30 surrounding the spool 28 in a telescoping relationship. The spool 28 and the sleeve 30 are adapted to rotate relative to each other for angular displacement, as seen in the disassembled view of FIG. 2. As seen, the spool 28 has a plurality of axially extending grooves 84 and 86 and two circumferentially extending grooves 80 and 82 formed in the outer periphery thereof The sleeve 30 has a plurality of sets of circumferentially aligned openings 88, 89, 90 extending through the circumferential wall thereof.

The axially and circumferentially extending grooves formed in the outer periphery of the spool 28 and the circumferentially aligned openings in the sleeve 30 are selectively placed in fluid communication with each other so as to form, at any one time, one of three possible flow paths in the torque amplifier. The construction and the operation of the control valve assembly will be later described in detail in conjunction with FIG. 3.

As seen from FIG. 1, a torque amplifier unit or gerotor unit 32 is disposed adjacent the housing 22 which accommodates the control valve assembly 24. As shown, the torque amplifier unit 32 is tightly secured between the underside of the housing 22 and a mounting plate 34 by means of bolts or cap screws 36 with a spacer plate 38 interposed therebetween. The bolts or cap screws 36 extend through the mounting plate 34. The mounting plate 34 is tightly secured to the top surface of the transmission casing 14 by means of stud bolts 40.

As is well known to those skilled in the art, the torque amplifier unit 32 comprises a stationary internally toothed member or a ring 42, and an externally toothed member or a star 44 disposed within the stationary internally toothed member for rotary and orbital motion therein. The internally toothed member 42 and the externally toothed members 44 are so arranged that the teeth thereof (typically 7 and 6, respectively,) move into and out of intermeshing engagement to define a plurality of expanding and contracting fluid or volume chambers 46 during rotary and orbital movement of the externally toothed member 44. The construction and the operation of the gerotor unit is well known to those skilled in the art; hence, no further description thereof will be made.

Figure 2:
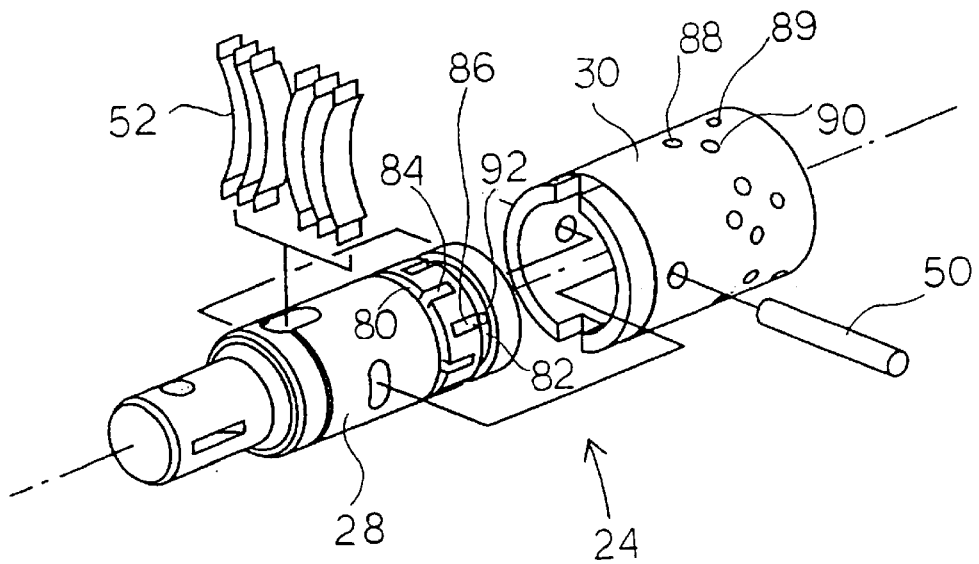
FIG. 2 is a perspective, disassembled view showing the control valve assembly of the torque amplifier comprising the spool and the sleeve.

The spool member 28 has a bore in which a first drive shaft 48 is movably disposed to connect the control valve assembly 24 drivingly to the torque amplifier unit 32. Specifically, one end of the first drive shaft 48 is bifurcated to snugly receive a stop pin 50, and the other end of the first drive shaft 48 is splined to the bore of the externally toothed member 44 of the torque amplifier unit 32. As seen in FIG. 2, the stop pin 50 is snugly received in a pair of diametrically opposite openings formed in the sleeve member 30. The spool member 28 has a corresponding pair of somewhat oblong openings formed therein to receive the stop pin 50.

It should be noted that because of the oblong openings in the spool 28, the spool 28 and the sleeve 30 can be rotated relative to each other through 12 degrees, by way of example only, from a neutral position either in a clockwise or counter-clockwise direction. With this arrangement, a rotation of the spool 28 will result in a follow-up rotational movement of the sleeve 30, in response to the flow of fluid through the torque amplifier unit 32. Also, it should be noted that the sleeve member 30 has a pair of diametrically opposite notches formed adjacent the shoulder portion thereof to receive a plurality of leaf springs 52 which extend through an opening formed in the spool 28. The leaf springs 52 act to normally keep the spool 28 and the sleeve 30 in the neutral position which corresponds to the neutral position of the control valve assembly.

As seen from FIG. 1, the torque amplifier 12 includes an output shaft 54 which is disposed substantially within a cavity 53 in the transmission casing 14 in alignment with the input member 26 and the longitudinal axis of the housing 22 and the torque amplifier 32. The output shaft 54 is rotatably supported in a central opening of the mounting plate 34 by means of a bearing 56. Preferably, the output shaft 54 has a splined bore 55. Disposed in the splined bore 55 of the output shaft 54 is a second drive shaft 58 which has one splined end drivingly connected to the splined bore 55 of the output shaft 54 and the other splined end drivably connected to the splined bore of the externally toothed member of the torque amplifier unit 32. With this arrangement, the power generated by the orbital movement of the externally toothed member 44 is transmitted to the output shaft 54 through the second drive shaft 58. The speed ratio of the input member 26 and the output shaft 54 is 1:1, which provides an increased torque to the output shaft. As seen, a major portion of the second drive shaft 58 is accommodated in the bore of the output shaft 54, which means a minimum vertical length of the torque amplifier.

One important feature of the present invention is that the second drive shaft 58 has an axial passage 60 which is in communication with the cavity 53 in the transmission casing 14 through at least one passage or opening 62 extending radially through the output shaft 54. The radial passage 62 in the output shaft 54 serves as an outlet for the return fluid from the torque amplifier unit 32. Another important feature of the present invention is that the output shaft 54 of the torque amplifier 12 has a downwardly extending portion 66 adapted to support an input gear 64 of a reduction gear system 16. The downwardly extending portion 66 of the output shaft 54 is rotatably supported by means of a bearing 68 provided on the bottom of the cavity 53 in the transmission casing 14. As seen, the input gear 64 is in meshing engagement with an output gear 70 which is rotatably supported in the transmission casing 14 and which is drivingly connected to the steering linkage 20 to steer the wheels 18 depending upon the direction and the amount of rotation of the output shaft 54. It should be noted that the output shaft 54 serves as the input member of the reduction gear unit 16. In this arrangement, a single power transmitting shaft is employed to act as the output shaft of the torque amplifier 12 as well as the input member of the reduction gear unit 16. This will not only permit a reduction in the number of parts in the overall arrangement but also simplify manufacture/assembly as compared with the prior art devices.

Also, it should be noted that the present invention provides a simplified arrangement for supporting the output shaft 54 for rotation, which comprises the bearing 68 provided on the bottom of the cavity 53 in the transmission casing 14 as well as a bearing 56 mounted to the mounting plate 34. This arrangement serves to prevent steering stick or lock due to a heavy radial load.

In the power steering system according to the present invention, the cavity 53 of the transmission casing 14 is utilized as a reservoir or drain tank as is generally the case with most conventional power steering systems. This enables the use of a single pressurized fluid line 74 while dispensing with the need for a separate return fluid line. One end of the pressurized fluid line 74 extends into the cavity 53 and includes a suction filter 76 positioned below the fluid level. The other end of the pressurized fluid line 74 is connected to an inlet 78 of the housing 22. A pump 80 is provided in the fluid line 74 to provide a pressurized fluid to the inlet port 78. It should be understood that the cavity 53 of the transmission casing 14 serves as the reservoir or tank for the return fluid as well as a source of such fluid.

With continued reference to FIG. 1, the control valve assembly 24 which comprises the spool 28 and the sleeve 30 has a neutral position in which a first fluid flow path is established to bypass the torque amplifier unit 32 so as not to create pressure differential between the volume chambers 46. The control valve assembly also has a left and a right steering position in which a second and a third flow path is established to supply the pressurized fluid to the torque amplifier unit 32 so as to produce pressure differential between the volume chambers 46. No further description of the structure and operation of the control valve assembly will be given as they are well known to those skilled in the art.

Figure 3:
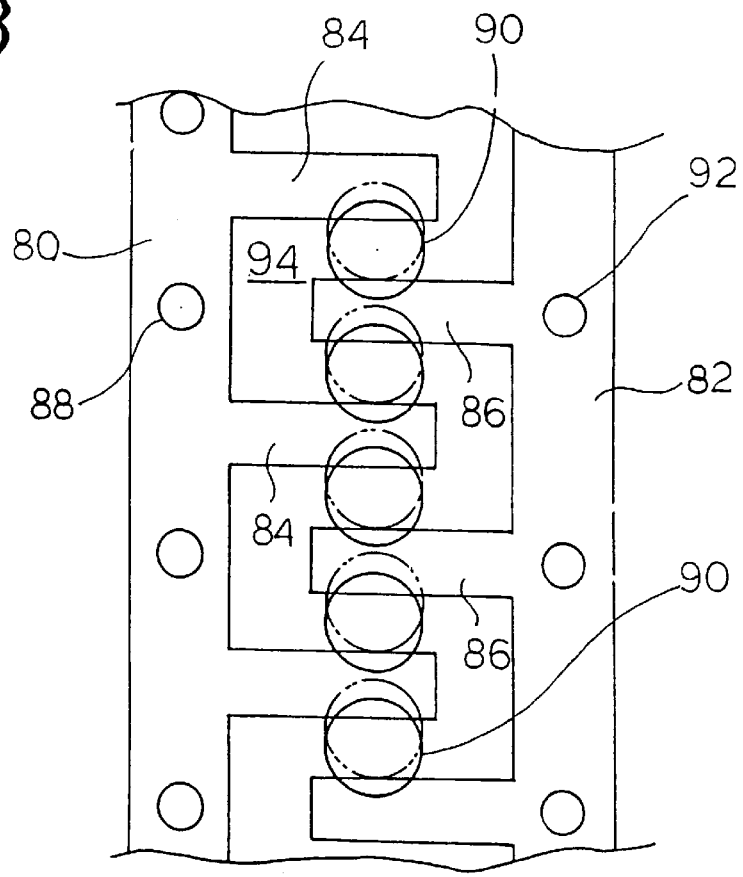
FIG. 3 is an overlay view showing the relative position of the spool and the sleeve when the control valve assembly moves between the neutral and various steering positions.

FIG. 3 is a diagramatic view for explaining the formation of the flow paths in the control valve assembly 24 through relative rotation of the spool 28 and the sleeve 30. The spool and the sleeve move upwardly and downwardly relative to each other, as seen in FIG. 3. As best seen in FIG. 2, the spool 28 has two axially spaced, circumferential grooves 80 and 82 formed in the outer periphery thereof. The circumferential groove 82 has associated therewith a plurality of openings 92 extending through the spool, as shown in FIG. 3. The circumferential grooves 80 and 82 have associated therewith axial grooves 84 and 86, respectively, which are in communication with their associated circumferential grooves. The sleeve 30 has two sets of circumferentially spaced openings 88 and 89 extending therethrough although the openings 89 are not shown in FIG. 3 for clarity of illustration. Normally, these openings 88 and 89 are in alignment with, thus communicate with, the circumferential grooves 80 and 82 of the spool 28, respectively. The sleeve 30 also includes a plurality of circumferentially spaced openings 90 which are selectively placed in communication with the volume chambers 44 depending upon the relative position of the spool and the sleeve. The circumferentially spaced openings 90 are so sized relative to lands disposed between adjacent axial grooves 84 and 86 that they are simultaneously in communication with both axial grooves when the sleeve 30 is rotated to a position as indicated by the solid line in FIG. 3 corresponding to the neutral position of the control valve assembly 24. When the sleeve 30 is rotated to a position as indicated by the phantom line in FIG. 3, every other opening 90 is in communication with the axial grooves 84 connected to the circumferential groove 80 while, at the same time, the remaining every other opening 90 is in communication with the axial grooves 86 connected to the circumferential groove 82. In this position, a predetermined number of the openings 90 which are in communication with the axial grooves 84 are fluidly connected to the volume chambers to pressurize them. At the same time, the same predetermined number of the openings 90 which are in communication with the axial grooves 86 are fluidly connected to the volume chambers to drain them.

If the sleeve 30 is rotated in the opposite direction from the neutral position, the predetermined number of the openings 90 which are in communication with the axial grooves 84 are fluidly connected to the volume chambers to drain them and, at the same time, the same predetermined number of the openings 90 which are in communication with the axial grooves 86 are fluidly connected to the volume chambers to pressurize them. In this manner, the control valve assembly 24 is controlled to move the torque amplifier unit 32 to the left, the neutral or the right steering position. In a typical arrangement, the sleeve 30 has six openings 88, twelve openings 90 and six openings 89.

The operation of the power steering system will be hereinafter described in connection with how the operating fluid flows. It is to be noted that the return fluid from the volume chambers 46 of the torque amplifier unit 32 flows in the same path irrespective whether the control valve assembly 24 assumes the left, neutral or right steering position. In proceeding with the following description, let it be assumed that the power steering system is of a so-called "open-center" type having a reduced power loss wherein the inlet and outlet ports are in communication with each other at all times. However, it should be apparent to those skilled in the art that the present invention can equally be applied to a "closed-center" type arrangement wherein in the neutral position, the inlet port is isolated from the outlet port so that the inlet port always has a high pressure applied thereat permitting a quicker steering response.

The pressurized fluid being supplied by the pump 80 from the reservoir 53 in the transmission casing 14 flows through the feed line 74 into the inlet port 78 of the torque amplifier 12. The pressurized fluid flows through a fluid passage 79 extending radially through the housing 22, a circumferential groove 79' formed in the central bore of the housing, and the openings 88 extending through the sleeve 30 into the circumferential groove 80 and then the axial grooves 84 formed in the outer periphery of the spool 28. The fluid then flows through the openings 90 into the axial grooves 86, bypassing the passages to the volume chambers 46. Thence, the fluid flows through the circumferential groove 82 and the openings 92 into a space 93 in the central bore of the spool 28 around the first drive shaft 48. Next, the fluid flows into a radially and axially extending passage 95 formed in the first drive shaft 48 and thence through the passage 60 in the second drive shaft 58 and the radial outlet passage 62 in the output shaft 54 into the reservoir 53.

The operating fluid in the cavity 53 of the transmission casing 14 is maintained substantially at the same level as the outlet port 61 of the output shaft 54 so as to lubricate the reduction gear unit 16 immersed in the fluid. In the arrangement according to the present invention, the return fluid line can be provided by merely machining the first and second drive shafts 48 and 58 and the output shaft 54 to form the required passages 95, 60 and 62. This will eliminate the need for a separate return line and associated elements conventionally provided in this type of system thus reducing costs of manufacture and assembly. It should be apparent to those skilled in the art that this inventive concept can equally be applied to the three-port fluid pressure operated torque amplifier as described in Japanese Laid Open Utility Model Application No. 1-145575 and Japanese Laid Open Patent Application No. 2-171388 by modifying the systems in such a manner as to eliminate either the outlet or drain port of the three ports to provide a two-port system It is also apparent that the overall torque amplifier 12 could, within the scope of the present invention, be made in accordance with the teachings of co-pending application U.S. Ser. No. 997,441, filed Dec. 23, 1997, in the names of Sohan L. Uppal and Leslie J. Kasper, for an "IMPROVED TORQUE GENERATOR STEERING DEVICE". In that event, references hereinafter and in the appended claims to a second drive shaft drivingly connected to an output shaft will be understood to refer to the sleeve valve which receives follow-up movement from the externally toothed member and has an output shaft formed integrally therewith.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed:

1. A fluid pressure operated torque amplifier comprising: a housing having a pressurized fluid inlet leading from a source of pressurized fluid; a torque amplifier unit including a first stationary internally toothed member and a second externally toothed member disposed within the first internally toothed member for orbital motion therein, the teeth of the first internally toothed member and the second externally toothed member intermeshing to form a plurality of expanding and contracting volume chambers for hydraulically generating a motive power; a control valve assembly disposed within the housing adjacent to the torque amplifier unit and adapted to be operated between a neutral position in which a first fluid flow path is established to bypass the volume chambers and a left and a right steering position in which corresponding flow paths are established to supply the pressurized fluid to the volume chambers, the control valve assembly comprising a first rotatable member having an input member extending outwardly from the housing, and a second rotatable follower member telescopingly disposed relative to the first rotatable member, a rotation of the first rotatable member through rotation of the input member causing the first rotatable member and the second rotatable follower member to rotate relative to each other to move the control valve assembly from the neutral position to the left or right position; a first drive shaft disposed within the first rotatable member and having one end drivably connected to the second rotatable follower member and the other end drivingly connected to the second externally toothed member of the torque amplifier unit; a second drive shaft having one end drivably connected to the second externally toothed member of the torque amplifier unit and the other end drivingly connected to an output shaft; characterized in that the output shaft has a return fluid outlet leading to a reservoir; the first and second drive shafts have passages formed therein and that when the control valve assembly is in the left or right position, the fluid exiting the volume chambers of the torque amplifier unit flows through the control valve assembly, the passages of the first and second drive shafts and the return fluid outlet of the output shaft into the reservoir.

2. A fluid pressure operated torque amplifier as set forth in claim 1, wherein when the control valve assembly is in the neutral position, the pressurized fluid flowing from the inlet in the housing into the control valve assembly bypasses the volume chambers, flowing back through the control valve assembly and the passages of the first and second drive shafts and the return fluid outlet of the output shaft into the reservoir.

3. A fluid pressure operated torque amplifier as set forth in claim 1, wherein the output shaft has a splined bore accommodating a major portion of the length of the second drive shaft therein, the second drive shaft having one end splined to the bore of the second externally toothed member and the other end splined to the bore of the output shaft.

4. A power steering system for use in a vehicle, comprising: a control valve assembly disposed within a housing and including a steering torque input means adapted to be operated between a neutral position and a left and a right steering position; a fluid pressure operated torque amplifier including a torque amplifier unit adapted to generate an amplified torque in dependence upon the position of the steering torque input means and a drive shaft for transmitting the amplified torque generated by the torque amplifier unit to an output means; a reduction gear unit disposed within a cavity in a transmission casing and having an input member drivably connected to the output means of the torque amplifier unit and an output member drivingly connected to a steering linkage for the vehicle; characterized in that the torque amplifier is mounted on the transmission casing, the output means of the torque amplifier extends into the cavity of the transmission casing to serve as the input member of the reduction gear unit; the housing has a pressurized fluid inlet leading from a reservoir through a pump; the output means of the torque amplifier has an outlet for the return fluid leading to the reservoir through which the return fluid flows from the torque amplifier into the reservoir.

5. A power steering system as set forth in claim 4, wherein the torque amplifier unit of the fluid pressure operated torque amplifier includes a first stationary internally toothed member and a second externally toothed member disposed within the first internally toothed member for orbital motion therein, the teeth of the first internally toothed member and the second externally toothed member intermeshing to form a plurality of expanding and contracting volume chambers for hydraulically generating a motive power, the control valve assembly being disposed within the housing adjacent to the torque amplifier unit and adapted to be operated between a neutral position in which a first fluid flow path is established to bypass the volume chambers and a left and a right steering position in which corresponding flow paths are established to supply the pressurized fluid to the volume chambers, the control valve assembly comprising a first rotatable member having an input member extending outwardly from the housing, and a second rotatable follower member telescopingly disposed relative to the first rotatable member, a rotation of the first rotatable member through rotation of the input member causing the first rotatable member and the second rotatable follower member to rotate relative to each other to move the control valve assembly from the neutral position to the left or right position, a first drive shaft being disposed within the first rotatable member and having one end drivably connected to the second rotatable follower member and the other end drivingly connected to the second externally toothed member of the torque amplifier unit, a second drive shaft having one end drivably connected to the second externally toothed member of the torque amplifier unit and the other end drivingly connected to an output shaft, and that the first and second drive shafts have passages formed therein and that the return fluid from the volume chambers of the torque amplifier unit flows through the control valve assembly, the passages of the first and second drive shafts and the return fluid outlet of the output shaft into the reservoir.

6. A power steering system as set forth in claim 4, wherein the output means of the torque amplifier unit includes an elongated portion for supporting an input gear of the reduction gear unit for rotation, the elongated portion of the output means being journalled on the bottom of the cavity of the transmission casing by means of a bearing.

\* \* \* \* \*